(12) United States Patent
Yoon et al.

(10) Patent No.: US 10,556,590 B2
(45) Date of Patent: Feb. 11, 2020

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Dong Pil Yoon, Incheon (KR); Howon Seo, Gwacheon-si (KR); Jungwook Kim, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 198 days.

(21) Appl. No.: 15/646,365

(22) Filed: Jul. 11, 2017

(65) Prior Publication Data

US 2018/0222483 A1    Aug. 9, 2018

(30) Foreign Application Priority Data

Feb. 8, 2017 (KR) .......................... 10-2017-0017586

(51) Int. Cl.
*B60W 30/18* (2012.01)
*B60W 30/14* (2006.01)
(Continued)

(52) U.S. Cl.
CPC ...... *B60W 30/18072* (2013.01); *B60W 10/06* (2013.01); *B60W 10/18* (2013.01); *B60W 30/143* (2013.01); *B60W 50/0097* (2013.01); *B60W 2520/10* (2013.01); *B60W 2550/142* (2013.01); *B60W 2550/402* (2013.01); *B60W 2710/0666* (2013.01); *B60W 2710/18* (2013.01); *B60W 2720/10* (2013.01); *Y02T 10/76* (2013.01)

(58) Field of Classification Search
CPC .......... B60W 30/18072; B60W 10/06; B60W 10/18; B60W 30/143; B60W 2520/10; B60W 2550/142
USPC ........................................................ 701/93
See application file for complete search history.

(56) References Cited

U.S. PATENT DOCUMENTS 8,340,884 B1* 12/2012 He .................. B60W 30/18072
340/439
9,096,229 B2   8/2015 Eriksson et al.
(Continued)

FOREIGN PATENT DOCUMENTS

| JP | 2006-111183 A | 4/2006 |
| JP | 2012-66705 A | 4/2012 |
| KR | 10-2016-0034210 A | 3/2016 |

*Primary Examiner* — Thomas G Black
*Assistant Examiner* — Wae L Louie
(74) *Attorney, Agent, or Firm* — Morgan, Lewis & Bockius LLP

(57) ABSTRACT

A vehicle and a control method of the vehicle are provided. The vehicle includes an engine management system to drive an engine to adjust a driving torque of the engine to accelerate the vehicle, a communicator to receive road gradient information, and a controller configured to control the engine management system such that running speed of the vehicle follows a target speed. The controller predicts an increase amount of speed of a next downhill section based on the road gradient information, and determines a start point of coasting control of a current section for maximizing a coasting distance based on the predicted speed increase amount.

20 Claims, 13 Drawing Sheets

(51) Int. Cl.
*B60W 10/06* (2006.01)
*B60W 10/18* (2012.01)
*B60W 50/00* (2006.01)

(56) References Cited

U.S. PATENT DOCUMENTS

| | | | |
|---|---|---|---|
| 2006/0213703 A1* | 9/2006 | Long | B60K 6/12 |
| | | | 180/65.245 |
| 2015/0134160 A1* | 5/2015 | Liang | B60W 10/06 |
| | | | 701/22 |
| 2015/0152948 A1* | 6/2015 | Johnson | B60K 6/26 |
| | | | 60/337 |
| 2016/0016586 A1 | 1/2016 | Banerjee et al. | |
| 2016/0325728 A1* | 11/2016 | Yang | B60L 3/108 |
| 2016/0349751 A1* | 12/2016 | Sugimoto | G05D 1/0223 |
| 2016/0368499 A1* | 12/2016 | Kimura | B60K 6/543 |
| 2016/0375892 A1* | 12/2016 | Kim | B60W 20/13 |
| | | | 701/22 |
| 2017/0008525 A1* | 1/2017 | Ko | B60W 30/188 |
| 2017/0057488 A1* | 3/2017 | Lee | B60W 20/40 |
| 2018/0037229 A1* | 2/2018 | Nakano | B60W 10/02 |
| 2018/0170347 A1* | 6/2018 | Kim | B60W 50/0097 |
| 2018/0222483 A1* | 8/2018 | Yoon | B60W 30/18072 |
| 2019/0001984 A1* | 1/2019 | Huh | B60W 30/18072 |

\* cited by examiner

FIG. 11
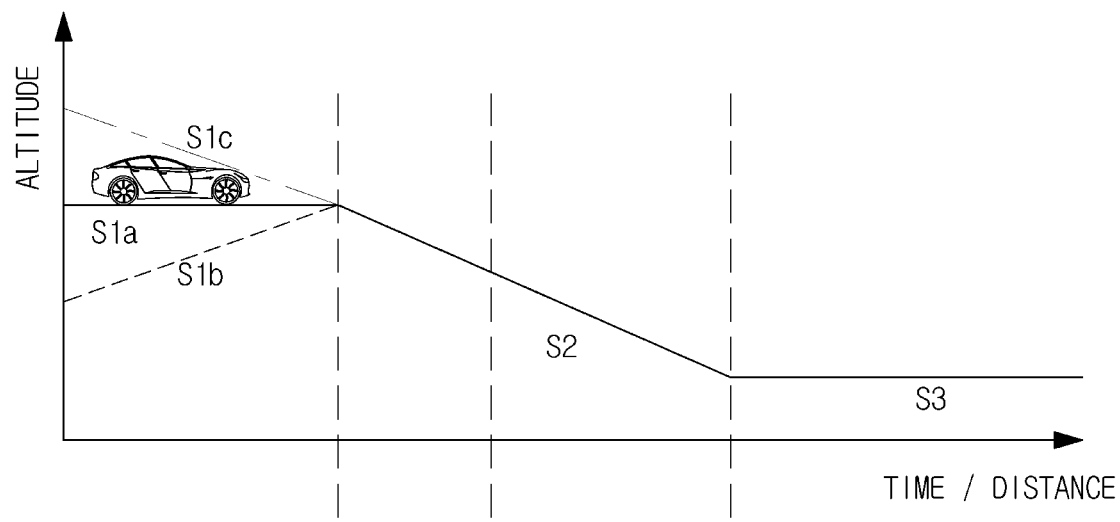
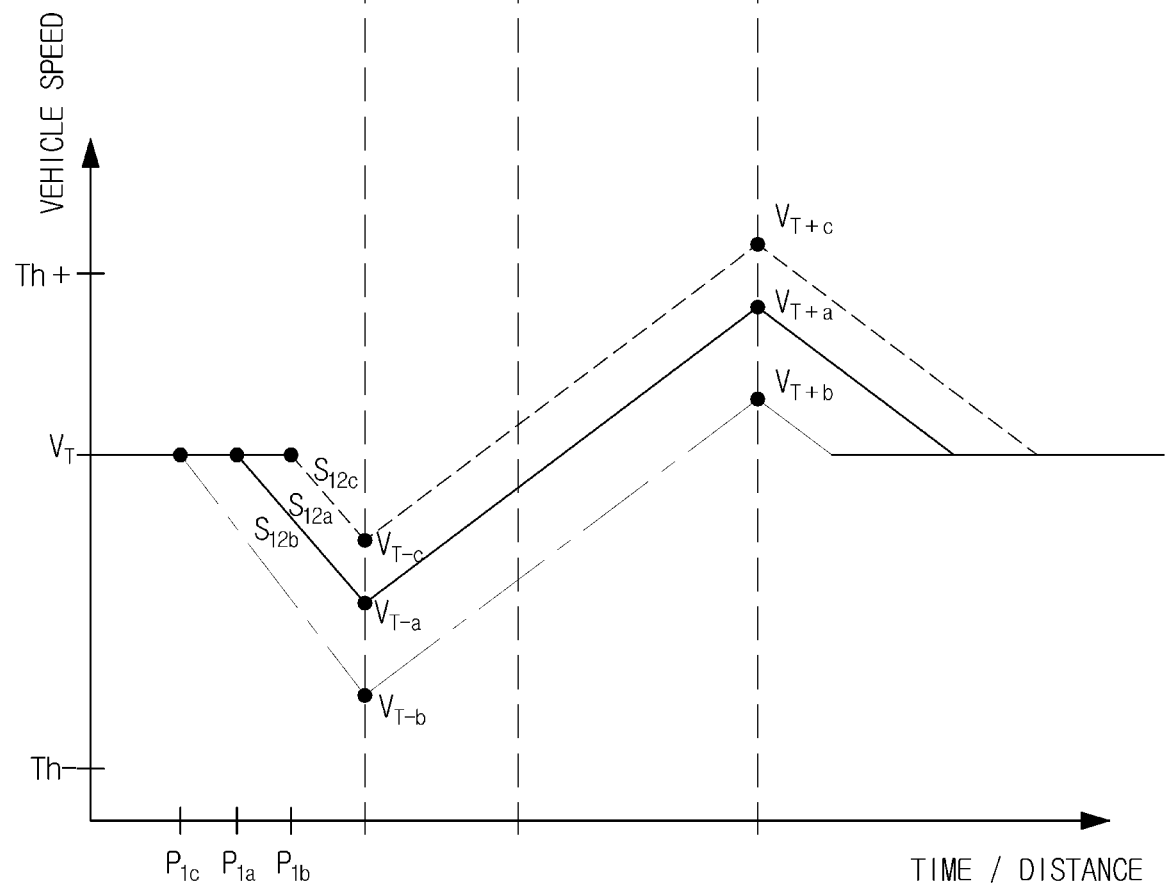

VEHICLE AND CONTROL METHOD THEREOF

CROSS-REFERENCE TO RELATED APPLICATION

This application is based on and claims the benefit of priority to Korean Patent Application No. 10-2017-0017586, filed on Feb. 8, 2017 with the Korean Intellectual Property Office, the disclosure of which is incorporated herein in its entirety by reference.

TECHNICAL FIELD

The present disclosure relates to a vehicle and a control method thereof.

BACKGROUND

In general, Cruise Control (CC) system is aimed at reducing driver's burden by partially automating acceleration/deceleration control of a vehicle in a driving direction.

A vehicle with the CC system is controlled to maintain a target speed when there is no vehicle ahead, and to keep, when there is a preceding vehicle ahead, a safe distance to the preceding vehicle.

When the vehicle runs uphill, it decelerates gradually if the driver does not put down the accelerator. However, if the CC system is installed in the vehicle, the vehicle is controlled to maintain the target speed without being decelerated by increasing fuel amount that is supplied to the engine.

If the vehicle is equipped with the CC system and being accelerated when running downhill so as to exceed a maximum target speed, the vehicle no longer performs acceleration/deceleration control automatically, or performs brake control for a long time in order to maintain the target speed.

SUMMARY

Aspect of the present disclosure provides a vehicle of preventing unnecessary deceleration control by estimating an amount of change in speed according to a change in slope of a road, and a method of controlling the vehicle.

According to an exemplary embodiment of the present disclosure, a vehicle includes an engine management system to drive an engine to adjust a driving torque of the engine to accelerate the vehicle, a communicator to receive road gradient information, and a controller configured to control the engine management system such that a running speed of the vehicle follows a target speed. The controller predicts an increase amount of speed of a next downhill section based on the road gradient information, and determines a start point of coasting control of a current section for maximizing a coasting distance based on the predicted increase amount of speed.

The controller may determine the start point of the coasting control of the current section based on the predicted increase amount of speed and a road inclination of the current section.

Further, the controller may determine a maximum target speed value of the next downhill section which maximizes the coasting distance based on the predicted increase amount of speed and may determine the start point of the coasting control of the current section based on the determined maximum target speed value of the next downhill section.

The maximum target speed value of the next downhill section may be greater than the target speed.

If the current section is a first section, a next downhill section of the first section is a second section, and a next downhill section of the second section is a third section, the controller may determine the maximum target speed value of the second section based on a road inclination of the third section.

The controller may determine the maximum target speed value of the second section based on a road inclination of the first section and a road inclination of the third section.

The controller may determine a value that is greater by half of the increase amount of speed in the second section than the target speed as the maximum target speed value of the second section when the first section and the third section are flat.

The controller may predict the increase amount of speed in the next downhill section based on a road inclination and a length of the next downhill section The controller may determine whether the next downhill section is an effective downhill section in which coasting acceleration occurs based on the road gradient information, and if the next downhill section is the effective downhill section, predict the increase amount of speed in the next downhill and determine the start point of the coasting control of the current section for maximizing the coating distance based on the predicted increase amount of speed.

The road gradient information may include information on a road gradient of the current section and a road gradient of the next downhill section and a distance from the vehicle.

The vehicle may further include a brake control device to control braking of the vehicle. The controller may control the brake control device such that the braking is performed when the running speed of the vehicle exceeds a preset maximum threshold value of the target speed.

The controller may control the engine management system such that the running speed of the vehicle follows the target speed when a cruise control system is operated, and release an operation of the cruise control system when the running speed of the vehicle exceeds a preset maximum threshold value of the target speed or the running speed of the vehicle is less than a preset minimum threshold value of the target speed.

Further, in accordance with another exemplary embodiment of the present disclosure, a control method for a vehicle, which controls an engine management system such that a running speed of the vehicle follows a target speed, includes steps of receiving road gradient information, estimating an increase amount of speed of a next downhill section based on the road gradient information and deciding a start point of coasting control of a current section for maximizing a coasting distance based on the estimated increase amount of speed.

The step of deciding the start point of the coasting control may determine the start point of the coasting control of the current section based on the predicted increase amount of speed and a road inclination of the current section.

The step of deciding the start point of the coasting control may further includes steps of deciding a maximum target speed value of the next downhill section which maximizes the coasting distance based on the estimated increase amount of speed, and deciding the start point of the coasting control of the current section based on the determined maximum target speed value of the next downhill section.

If the current section is a first section, a next down section of the first section is a second section, and a next section of the second section is a third section, the determining the maximum target speed value may determine the maximum target speed value of the second section based on a road inclination of the third section.

The step of deciding the maximum target speed value may determine the maximum target speed value of the second section based on a road inclination of the first section and a road inclination of the third section.

The step of deciding the maximum target speed value may include setting a value which is greater by half of the increase amount of speed in the second section than the target speed as a maximum target speed value of the second section when the first section and the third section are flat.

The step of estimating the increase amount of speed may predict an increase amount of speed in the next downhill section based on a road inclination and a length of the next downhill section.

Prior to the step of estimating the increase amount of speed, the control method may further include determining whether the next downhill section is an effective downhill section in which acceleration occurs based on the road gradient information. The predicting the increase amount of speed may predict the increase amount of speed in the next downhill section when the next downhill section is the effective downhill section.

BRIEF DESCRIPTION OF THE DRAWINGS

These above and/or other aspects of the disclosure will become apparent and more readily appreciated from the following description of embodiments, taken in conjunction with the accompanying drawings in which:

FIG. 11 is another graph of vehicle speed with respect to a gradient of a first section.

DETAILED DESCRIPTION

Figure 1:
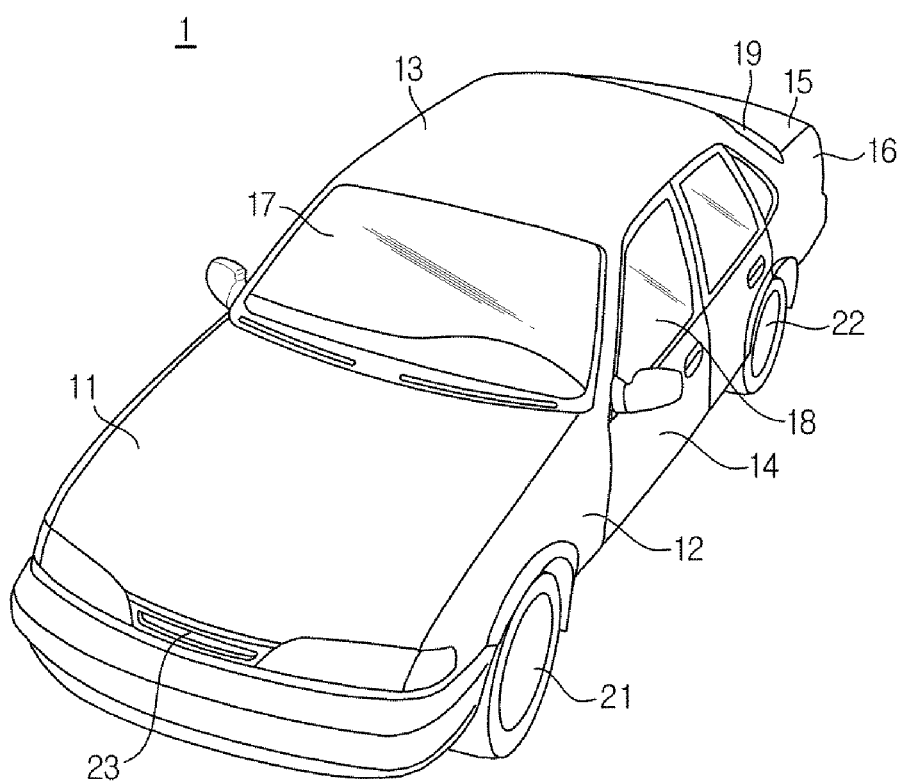
FIG. 1 is a schematic view showing an outer appearance of a vehicle including cruise control system according to an embodiment of the present disclosure.

Like numbers refer to like elements throughout this specification. This specification does not describe all components of embodiments, and general information in the technical field to which the present disclosure belongs or overlapping information between the embodiments will not be described. The terms "part", "module", "member", and "block", as used herein, may be implemented as software or hardware, and according to embodiments, a plurality of "parts", "modules", "members", or "blocks" may be implemented as a single component, or a single "part", "module", "member", or "block" may include a plurality of components.

Throughout this specification, when a part is "connected" to another part, this includes the case in which the part is indirectly connected to the other part, as well as the case in which the part is directly connected to the other part, and the indirect connection includes a connection through a wireless communication network.

Also, It will be understood that when the terms "includes," "comprises," "including," and/or "comprising," when used in this specification, specify the presence of a stated component, but do not preclude the presence or addition of one or more other components.

Throughout this specification, the phrase "a member is located on another member" may be a meaning including the case in which another member exists between the members, as well as the case in which the member contacts the other member.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, the embodiments of the present disclosure will be described with reference to the accompanying drawings.

Figure 2:
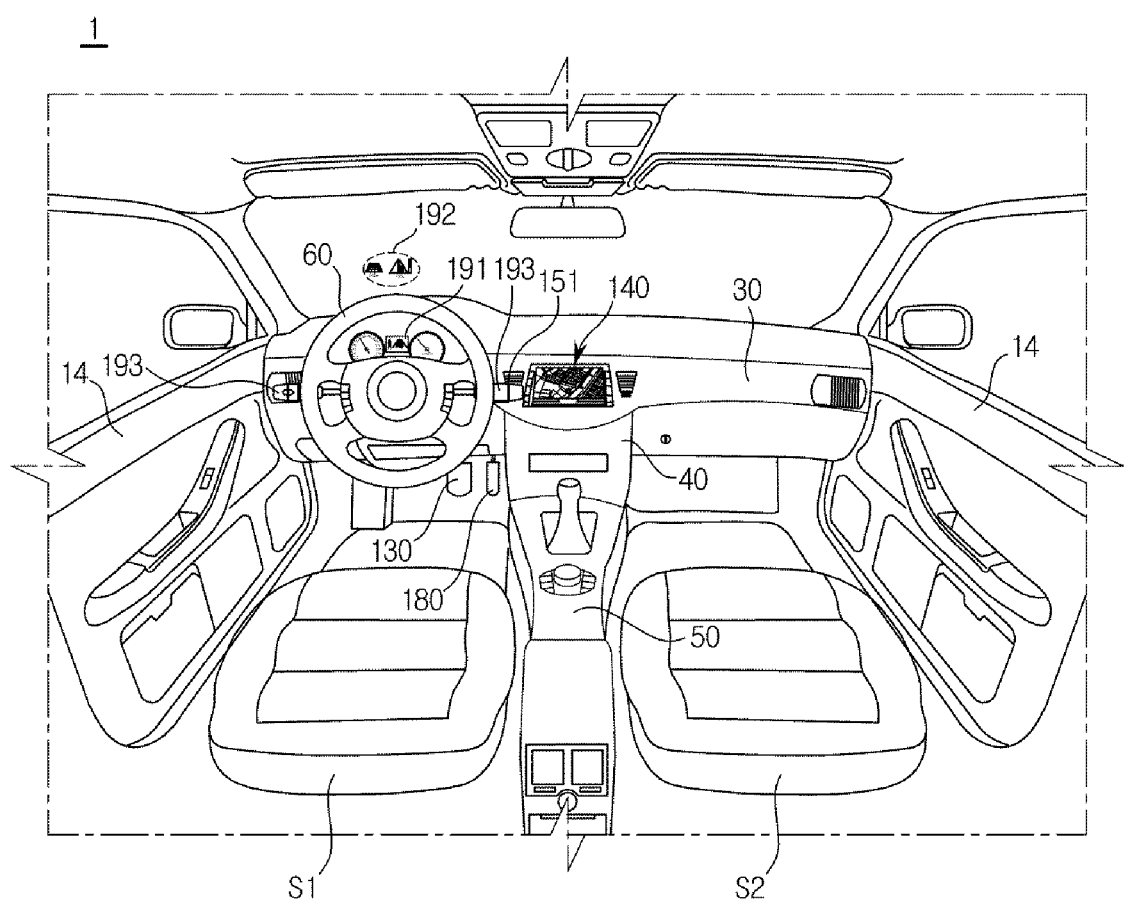
FIG. 2 is a schematic view showing an interior of a vehicle including a cruise control system according to an embodiment of the present disclosure.
Figure 3:
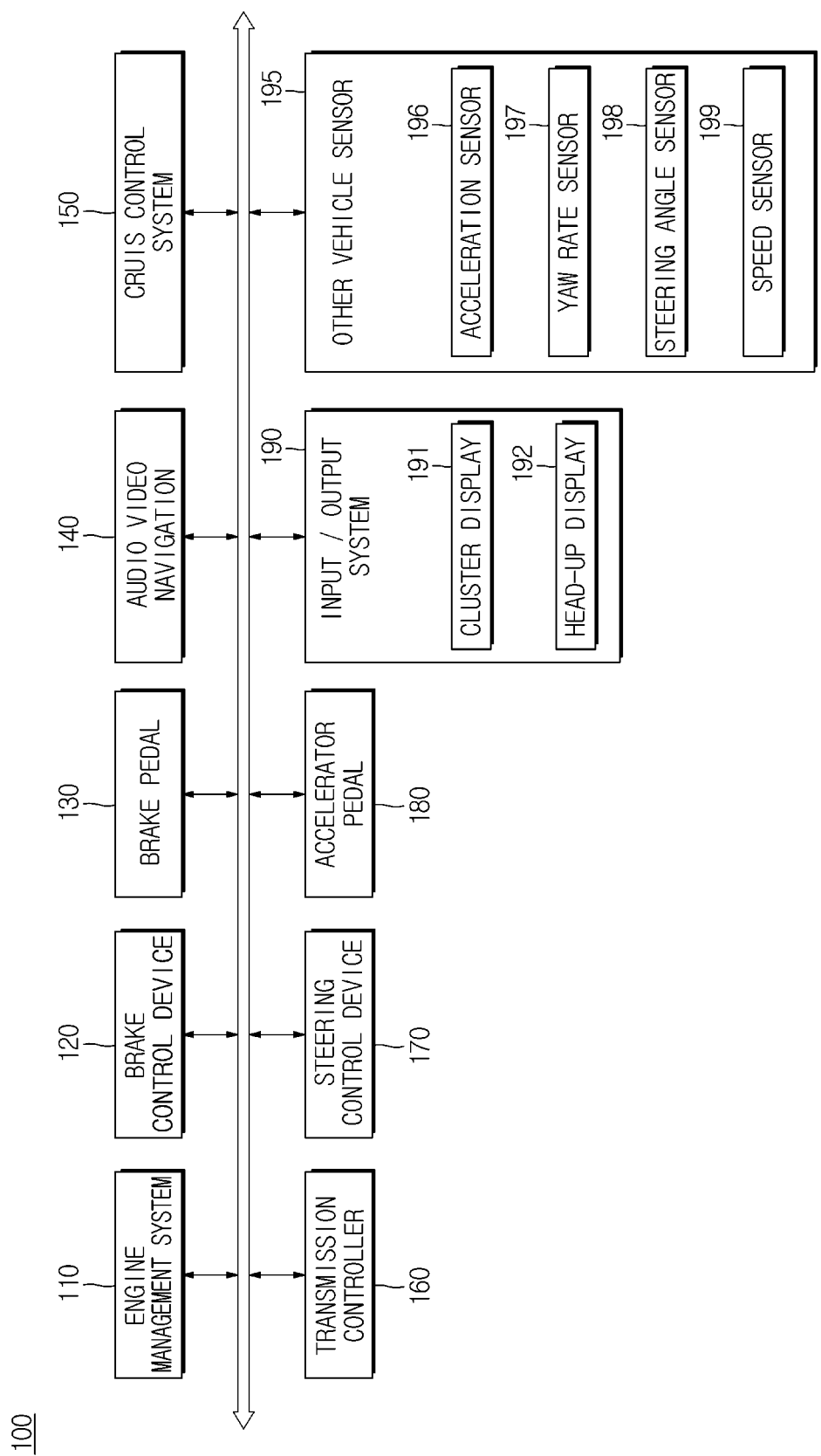
FIG. 3 is a block diagram showing various electronic devices included in a vehicle having a cruise control system according to an embodiment of the present disclosure.

FIG. 1 is a schematic view showing an outer appearance of a vehicle including a cruise control system according to an embodiment of the present disclosure. FIG. 2 is a schematic view showing an interior of the vehicle including the cruise control system according to the embodiment of the present disclosure. FIG. 3 is a block diagram showing various electronic devices included in the vehicle including the cruise control system according the embodiment of the present disclosure.

As shown in FIG. 1, a vehicle 1 according to an embodiment of the present disclosure may include a vehicle body 11 to 16 forming the outer appearance of the vehicle 1, a chassis (not shown) configured to support components of the vehicle 1, and a plurality of wheels 21 and 22 configured to move the vehicle body 11 to 16 and the chassis.

The wheels 21 and 22 may include a plurality of front wheels 21 disposed in the front portion of the vehicle 1, and a plurality of rear wheels 22 disposed in a rear portion of the vehicle 1. The vehicle 1 may move forward or backward by the rotation of the wheels 21 and 22.

The vehicle body 11 to 16 may include a hood 11, a front fender 12, a roof panel 13, a plurality of doors 14, a trunk lid 15, a quarter panel 16, and the like.

Outside the vehicle body 11 to 16, a front window 17 disposed in a front portion of the vehicle body 11-16, a plurality of side windows 18 disposed at the doors 14, and a rear window 19 disposed in the rear portion of the vehicle body 11-16 may be provided.

The vehicle 1 according to an embodiment of the present disclosure may include cruise control system, and a radar module 23 for sensing the preceding vehicles may be disposed below the hood 11.

Instead of the radar module 23, a laser module may be disposed to detect the preceding vehicles.

As shown in FIG. 2, inside the vehicle body 11 to 16, a plurality of seats S1 and S2 on which passengers sit, a dashboard 30 in which various instruments for controlling operations of the vehicle 1 and displaying driving information of the vehicle 1 are installed, a center fascia 40 on which a control panel for enabling a driver to manipulate various electronic devices included in the vehicle 1 is mounted, a center console 50 in which a gear stick, a parking brake stick, etc. are installed, and a steering wheel 60 for enabling the driver to change the driving direction of the vehicle 1 may be provided.

The seats S1 and S2 may allow the driver to operate the vehicle 1 in a comfortable and stable posture, and may include a driver's seat S1 on which the driver sits, a passenger's seat S2 on which a passenger sits, and a rear seat (not shown) located in the rear space inside the vehicle 1. The dashboard 30 may include various meters, such as a speedometer, a fuel gauge, an automatic transmission selection lever lamp, a tachometer, and a tripmeter, to display driving-related information. Therefore, the driver can check current speed in real time based on information displayed on the speedometer or the like.

The center fascia 40 may be positioned between the driver's seat S1 and the front passenger's seat S2. In the center fascia 40, a manipulator for adjusting audio system, an air conditioner, and a heater, a vent of the air conditioner for controlling an inside temperature of the vehicle body 11 to 16, a cigar jack, and the like may be installed.

The center console 50 may be provided below the center fascia 40 between the driver's seat S1 and the passenger's seat S2, and a gear stick for shifting gears and a parking brake stick for parking may be installed in the center console 50.

The steering wheel 60 may be attached to the dashboard 30 in such a way to be rotatable with respect to the steering axis. The driver may rotate the steering wheel 60 clockwise or counterclockwise to change the driving direction of the vehicle 1. An angle of the steering wheel 60 rotated by the driver may be sensed by a steering wheel sensor (not shown) so that the driver's intention for changing the driving direction can be recognized.

Behind the steering wheel 60, a direction switching lever 193 may be provided. If the direction switching lever 193 is raised upward, a right turn signal may be generated, and if the direction switching lever 193 is lowered downward, a left turn signal may be generated.

In addition, a switch 151 may be positioned below the direction switching lever 193 to execute the cruise control system 150 according to an embodiment of the present disclosure.

In the chassis (not shown), a power generation apparatus (for example, an engine or a motor) to generate power for moving the vehicle 1 by burning fuel, a fuel supply apparatus to supply fuel to the power generation apparatus, a cooling apparatus to cool the power generation apparatus, an exhaust apparatus to exhaust gas generated by combusting fuel, a power transfer apparatus to transfer power generated by the power generation apparatus to the wheels 21 and 22, a steering apparatus to transfer information about the driving direction of the vehicle 1 controlled by the steering wheel 60 to the wheels 21 and 22, a brake apparatus to stop the rotation of the wheels 21, and a suspension apparatus to absorb vibration of the wheels 21 and 22 generated against the road may be installed.

The vehicle 1 may include various electronic devices 100 in combination with the mechanical apparatuses described above.

More specifically, as shown in FIG. 3, the vehicle 1 may include an engine management system (EMS) 110, a brake control apparatus 120 (for example, an electric stability control (ESC) apparatus), a brake pedal 130, Audio Video Navigation (AVN) system 140, the cruise control system 150, a transmission controller (TC) 160, a steering control apparatus 170, an accelerator pedal 180, an input/output control system 190, and other vehicle sensors 195. Electronic devices 100 shown in FIG. 3 may be a part of electronic devices included in the vehicle 1, and the vehicle 1 may further include other various electronic devices.

Further, the various electronic devices 100 included in the vehicle 1 may communicate with each other through a vehicle communication network NT. The Vehicle Communications Network (NT) may adopt a communication protocol, such as Media Oriented Systems Transport (MOST) having communication speed of up to 24.5 Mbps (mega-bits per second), FlexRay having communication speed of up to 10 Mbps, Controller Area Network (CAN) having communication speed of 125 kbps (kilo-bits per second) to 1 Mbps, and Local Interconnect Network (LIN) having communication speed of 20 kbps. The vehicle communication network NT can adopt a single communication protocol, such as MOST, FlexRay, CAN, and LIN, or a plurality of communication protocols.

The EMS 110 may perform fuel injection control, fuel ratio feedback control, fuel efficiency control, lean-burn control, ignition timing control, idling control, and the like in order to control the torque of the engine by driving the engine. The EMS 110 may include a single apparatus, or a plurality of apparatuses connected through communication.

If the EMS 110 or TC 160 makes the engine stop outputting a driving torque by stopping supplying fuel to the engine or stopping the operation of the power generation apparatus, when the vehicle 1 travels on an uphill section or a flat section, the vehicle 1 may decelerate although the driver does not step on the brake pedal 130, due to the pumping friction loss of the engine, driving loss of auxiliary machinery, the rotational friction loss of driving system, the air resistance, the rolling resistance of the front wheels 21 and the rear wheels 22, the slope resistance of the road, or the like.

Even when the vehicle 1 travels on a downhill section, the vehicle 1 may decelerate if the air resistance and the rolling resistance of the front wheels 21 and the rear wheels 22 are greater than an acceleration force generated due to the slope of the road.

Hereinafter, a downhill section where an acceleration force generated due to the slope of the road is less than or equal to the air resistance and the rolling resistance will be referred to as an "effective downhill section."

The brake control apparatus 120 may control braking of the vehicle 1, and may include anti-lock brake system (ABS).

The TC 160 may perform shifting point control, damper clutch control, pressure control at the time at which a friction clutch is turned on/off, and engine torque control during shifting. The TC 160 may be a single apparatus, or a plurality of apparatuses connected through communications.

A steering control apparatus 170 may assist the driver's steering operation by reducing the steering force during low-speed driving or parking and increasing the steering force during high-speed driving.

The brake pedal 130 may be manipulated by the driver's foot to put on the brakes, and configured to push the piston of a master cylinder to generate hydraulic pressure, thereby decelerating the vehicle. A pedal effect sensor (not shown) may measure a pedal effort applied to the brake pedal 130 by the driver's foot to determine the driver's braking intention.

The accelerator pedal 180 may be manipulated by the driver's foot for accelerating. The accelerator pedal 180 may be connected to a throttle valve body (not shown), and configured to increase, when it is pressed, the amount of air inhaled to cause rapid rotation, thereby accelerating the vehicle. Another pedal effect sensor (not shown) may measure a pedal effort applied to the accelerator pedal 180 by the driver's foot to determine the driver's acceleration intention.

An AVN system 140 may output music or images according to the driver's control command. More specifically, the AVN system 140 may play music or video according to the driver's control command, or may guide a route to a destination.

The display (not shown) of the AVN system 140 may be a touch sensing display (for example, a touch screen) capable of receiving the driver's touch inputs.

The AVN system 140 may employ a wireless communication unit to receive information about roads from an external server, and may guide a route to a destination based on the received information about the roads. Also, the AVN system 140 may include memory, and may guide a route to a destination based on information about roads stored in the memory.

The AVN system 140 may receive information about a road including gradient information (hereinafter, referred to as "road gradient information") of the road. In addition, the AVN device 140 may itself create road gradient information using information about roads.

For example, the road gradient information may include information about a distance from a current position of the vehicle 1 to an end point of a road section (hereinafter, referred to as a "first section") on which the vehicle 1 travels currently and about a gradient of the first section. Also, the road gradient information may further include information about a distance from the current position of the vehicle 1 to an end point of the next section (hereinafter, referred to as a "second section") of the first section and about a gradient of the second section. Also, the road gradient information may include information about a distance from the current position of the vehicle 1 to an end point of the next section (hereinafter, referred to as a "third section") of the second section and about a gradient of the third section. If the distance from the current position of the vehicle 1 to the end point of each section is already known, the AVN system 140 can calculate the length of each section.

If the AVN system 140 itself creates road gradient information based on road information received from the external server, the AVN system 140 may receive altitude values of a road according to distances from the current position of the vehicle 1 from the external server, divide the road into a plurality of sections based on the altitude values of the road with respect to the plurality of distances, and then create a length value and a gradient value of each section as road gradient information.

The road gradient information may be transmitted to the cruise control system 150.

The input/output control system 190 may receive the driver's control command inputted through a button, and display information corresponding to the driver's control command. The input/output control system 190 may include a cluster display 191 disposed on the dashboard 30 to display images, and a head-up display 192 to project images on the front window 17.

The cluster display 191 may be disposed on the dashboard 30 to display images. More specifically, the cluster display 191 may be disposed adjacent to the front window 17 so that the driver can acquire operation information of the vehicle 1, information about roads, or a driving route as long as the driver's eyeline does not greatly deviate from the front of the vehicle 1. In addition, the duster display 191 may display operations of the cruise control system 150 according to an embodiment of the present disclosure for the driver.

For example, the cluster display 191 may display target speed set by the driver so that the driver can check current speed and the target speed in real time.

The cluster display 191 may include a Liquid Crystal Display (LCD) panel or an Organic Light Emitting Diode (OLED) panel.

The head-up display 192 may project images on the front window 17. An image projected on the front window 17 by the head-up display 192 may include operation information of the vehicle 1, road information, or a driving route. In addition, the head-up display 192 may display operations of the cruise control system 150 according to an embodiment of the present disclosure for the driver.

The other vehicle sensors 195 may include an acceleration sensor 196, a yaw rate sensor 197, a steering angle sensor 198, and a speed sensor 199, which are installed in the vehicle 1 to sense the driving information of the vehicle 1.

The acceleration sensor 196 may measure the acceleration of the vehicle 1, and may include a lateral acceleration sensor (not shown) and a longitudinal acceleration sensor (not shown).

If it is assumed that the driving direction of the vehicle 1 is the X-axis, and an axis (Y-axis) that is vertical to the driving direction is a lateral direction, the lateral acceleration sensor may measure acceleration in the lateral direction.

The longitudinal acceleration sensor may measure acceleration in the X-axis direction being the driving direction of the vehicle.

The acceleration sensor 196, which is a device of detecting a change in speed per unit time, may sense a dynamic force such as acceleration, vibration, shock, etc., and measure acceleration using an inertia force, electrostriction, and the principle of gyro.

The yaw rate sensor 197 may be installed in the center of the vehicle 1, and detect a yaw rate value in real time.

The yaw rate sensor 197 may have a cesium crystal element therein. When the vehicle 1 rotates, the cesium crystal element may itself rotate to generate a voltage. The yaw rate sensor 197 may sense a yaw rate of the vehicle 1 based on the generated voltage.

The steering angle sensor 198 may measure a steering angle. The steering angle sensor 198 may be mounted on the lower end of the steering wheel 60, and may detect steering speed, a steering direction, and a steering angle of the steering wheel 60.

The speed sensor 199 may be installed inside the wheels 21 and 22 of the vehicle 1 to detect the rotation speed of the wheels 21 and 22, and may transmit the measured speed value to the cruise control system 150 through the network NT.

The cruise control system 150 may perform cruise control according to the driver's input of turning on/off the cruise control system 150, inputted through the switch 151.

So far, configuration of the vehicle 1 has been described.

Hereinafter, configuration and operations of the cruise control system 150 included in the vehicle 1 will be described.

Figure 4:
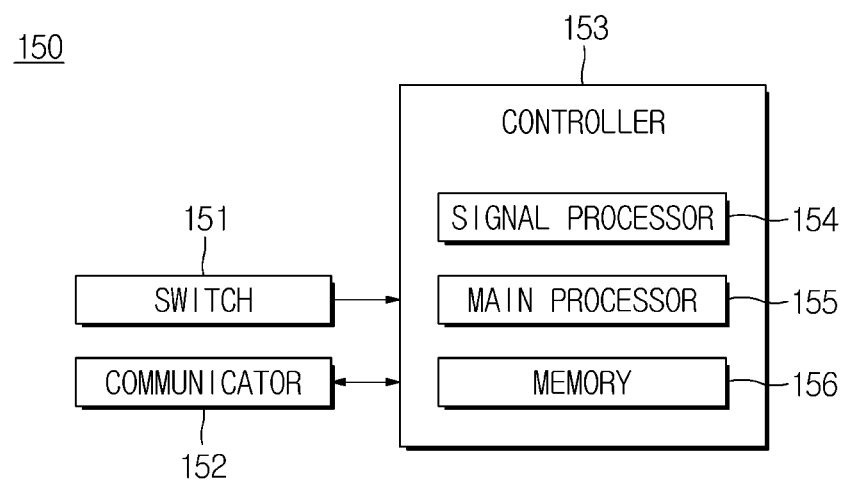
FIG. 4 is a block diagram of a cruise control system according to an embodiment of the present disclosure

FIG. 4 is a block diagram of a cruise control system according to an embodiment of the present disclosure.

Referring to FIG. 4, the cruise control system 150 may include a switch 151, a communicator 152, and a controller 153.

The switch 151 may include an On switch and an Off switch to receive a driver's control input of turning on/off the cruise control system 150.

Further, the switch 151 may receive target speed inputted by the driver. In this case, the driver may set the target speed using the direction switching lever 193 shown in FIG. 2. However, the present disclosure is not limited to this. The driver may set the target speed using a touch unit (not shown) included in the input/output control system 190 or the AVN system, or may set the current speed of the vehicle 1 to target speed by turning on the direction switching lever 193 during driving.

The communicator 152 may be connected to the vehicle communication network NT to receive communication signals transmitted from the various electronic devices 100 in the vehicle 1 and to transmit communication signals to the various electronic devices 100 in the vehicle 1 through the vehicle communication network NT. The communicator 152 is implemented with various electronic circuits to perform various functions, for example, noise filtering, A/D conversion, encoding/decoding and modulating.

Herein, the communication signals mean signals that are transmitted or received through the vehicle communication network NT. The communicator 152 may receive various sensor values measured by the other vehicle sensors 195, and transfer control signals processed by the cruise control system 150 to the various electronic devices 100.

For example, the communicator 152 may transfer various control signals for controlling the vehicle 1 to travel at constant speed set by the cruise control system 150 to the EMS 110 and the TC 160.

In addition, the communicator 152 according to the current embodiment may receive road gradient information from the AVN system 140 of FIG. 3 according to a control signal from the controller 153.

The controller 153 may control overall operations of the cruise control system 150. More specifically, the controller 153 may include a signal processor 154 to process various communication signals received from the communicator 152, a main processor 155 to compare the current speed of the vehicle 1 to target speed through various data of the cruise control system 150, and to generate various control signals to maintain cruise control according to the result of the comparison, and memory 156 to store various data.

More specifically, the signal processor 154 may receive a signal for turning on the cruise control system 150 through the switch 151, and then receive target speed 2 from the driver. According to another example, the signal processor 154 may enable the main processor 155 to set the current speed of the vehicle 1 to target speed by receiving a signal for turning on the switch unit 193 during driving.

The signal processor 154 may receive information of the current speed of the vehicle 1 from a wheel speed sensor (not shown) in the speed sensor 199, and transmit the information of the current speed to the main processor 155, in order to execute the cruise control system 150 according to an embodiment of the present disclosure.

In addition, the cruise control system 150 according to an embodiment of the present disclosure may receive pedal efforts measured by the pedal effort sensors in the accelerator pedal 180 and the brake pedal 130, and transmit the received pedal efforts to the main processor 155, in order to determine the driver's acceleration or deceleration intention.

Therefore, the main processor 155 may determine the driver's acceleration or deceleration intention, based on communication signals of the various electronic devices 100, acquired from the switch 151 and the communicator 152 by means of the signal processor 154, compare the current speed with the target speed 2, and perform cruise control according to the result of the comparison.

The main processor 155 may determine the driver's acceleration intention through the accelerator pedal 180. More specifically, if a pedal effort is continuously inputted through the accelerator pedal 180, and speed acquired through the speed sensor 199 exceeds a maximum threshold value of the target speed 2 for a first time, the main processor 155 may release the operation of the cruise control system 150 when the first time elapses. This indicates that the driver no longer wants to automatically control the vehicle speed according to the cruise control system 150.

In addition, if the main processor 155 determines the driver's deceleration intention through the brake pedal 130, the main processor 155 may release the operation of the cruise control system 150 according to an embodiment of the present disclosure. This also indicates that the driver no longer wants to automatically control the vehicle speed according to the cruise control system 150.

The main processor 155 in the cruise control system 150 according to the embodiment may generate control signals for displaying the operations on the touch screen of the AVN system 140 or the display of the input/output control system 190 in order to inform the driver of the operations.

Also, the main processor 155 in the cruise control system 150 according to an embodiment of the present disclosure may decide a start point at which coasting control (or control for reducing a driving force) starts in a current section (that is, a first section) of the vehicle 1 in order to maximize a coasting distance based on road gradient information received by the communicator 152. The main processor 155 may generate control signals for the EMS 110 and the TC 160 to stop the output of a driving torque from the engine by stopping supplying fuel to the engine or stopping the operation of the power generation apparatus at the start point at which the coasting control starts, and transfer the control signals through the communicator 152.

Herein, the coasting distance represents a distance to which the vehicle 1 can travel even when fuel is no longer supplied to the engine or when the operation of the power generation device stops. The longer coasting distance, the less fuel consumption.

Details about a method in which the main processor 155 decides a deceleration point of the first section for maximizing a coasting distance based on road gradient information will be described later.

The memory 156 may store programs and data of the cruise control system 150.

More specifically, the memory may be volatile memory such as S-RAM or D-RAM, or a non-volatile memory, such as flash memory, Read Only Memory (ROM), Erasable Programmable Read Only Memory (EPROM), and Electrically Erasable Programmable Read Only Memory (EEPROM).

The non-volatile memory may semi-permanently store control programs and control data for controlling the operations of the cruise control system 150. The volatile memory may load and temporarily store control programs and control data from the non-volatile memory. Also, the non-volatile memory may temporarily store inputs for turning on/off the switch 151, acquired through the switch 151, target speed, and various control signals output from the main processor 155.

So far, the configuration of the cruise control system 150 according to the embodiment has been described.

However, at least one component may be added or omitted in correspondence to the performance of the components of the vehicle 1 and the cruise control system 150 shown in FIGS. 3 and 4. Also, it will be easily understood by those skilled in the art that the relative positions of the components can change in correspondence to the performance or structure of the system.

Some of the components shown in FIGS. 3 and 4 may be software and/or hardware components such as field programmable gate arrays (FPGAs) and application specific integrated circuits (ASICs).

Hereinafter, a method in which the cruise control system 150 according to an embodiment of the present disclosure decides a deceleration point of the first section for maximizing a coasting distance based on road gradient information will be described.

Figure 5:
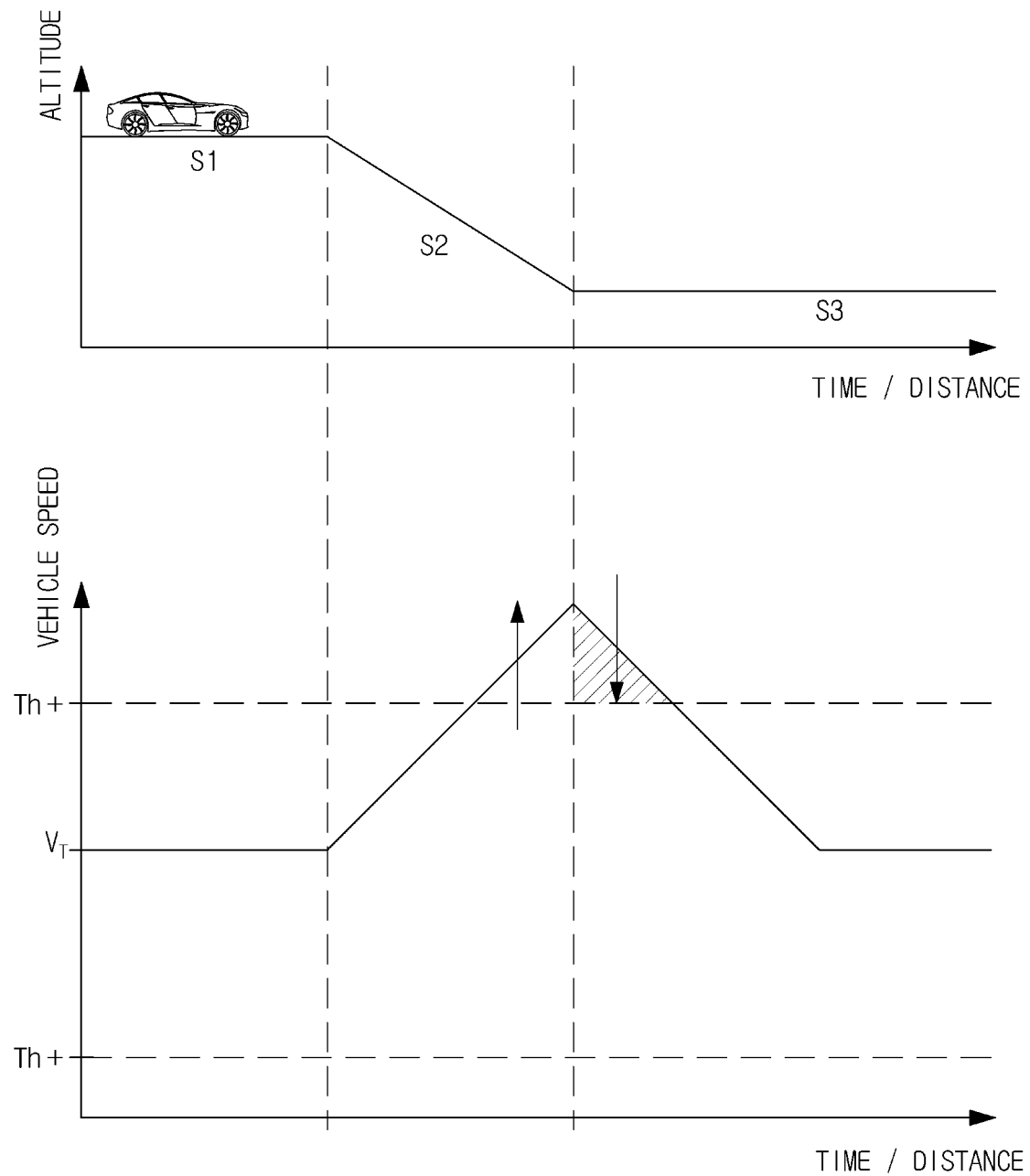
FIGS. 5 and 6 are views for comparing a cruise control system according to an embodiment of the present disclosure to a conventional cruise control system.
Figure 6:
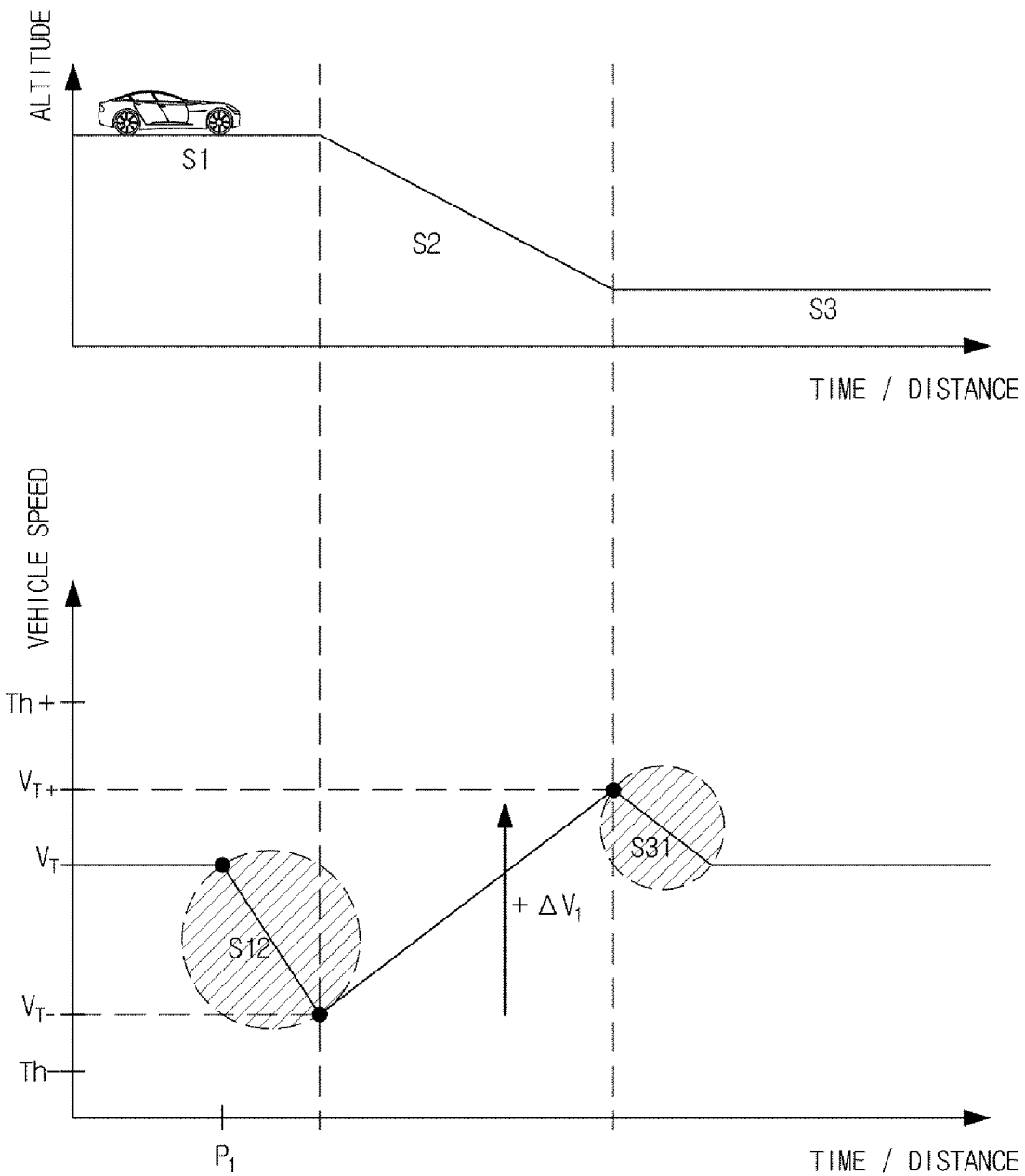

FIGS. 5 and 6 are views for comparing conventional cruise control system to the cruise control system according an embodiment of the present disclosure.

Referring to FIG. 5, the main processor 155 of the cruise control system 150 may control the EMS 110 and the TC 160 so that the speed of the vehicle 1 follows target speed Vt. If the speed of the vehicle 1 is higher than a maximum threshold value Th+ of the target speed Vt or lower than a minimum threshold value Th− of the target speed Vt for a first time, the operation of the cruise control system 150 may be released so that speed control is no longer performed automatically.

In order to prevent the problem, the driver may perform braking by stepping on the brake pedal 130 in advance so that the vehicle speed does not exceed the maximum threshold value Th+ of the target speed Vt, or may perform braking by stepping on the brake pedal 130 when the vehicle speed exceeds the maximum threshold value Th+ of the target speed Vt so that the vehicle speed can be maintained within a range (a range between Th− and Th+) of the target speed Vt before the first time elapses. However, in this case, kinetic energy loss may occur due to the braking, and fuel loss may also occur due to re-acceleration.

Referring to FIG. 6, the main processor 155 of the cruise control system 150 may estimate an amount +ΔV1 of change in speed in the next section due to a downhill slope in advance, based on gradient information of the road, and maximize driving distances (that is, coasting distances) of the coasting sections S12, S2, and S31.

In the coasting sections S12, S2, and S31, the vehicle 1 can travel although fuel is no longer supplied to the engine or the operation of the power generation apparatus stops. The coasting distances represent distances to which the vehicle 1 travels in the coasting sections S12, S2, and S31.

The gradient information of the road may include information about the length and gradient of a road section (that is, the first section S1) on which the vehicle 1 is currently located, the length and gradient of the second section S2 after the first section S1, and the length and gradient of the third section S3 after the second section S2.

The main processor 155 of the cruise control system 150 according to the embodiment may decide any one point p1 of the first section S1 as a start point at which coasting starts, before the vehicle 1 enters the next section (i.e., the second section; S2) in which a downward section exists, in order to maximize the coasting distance.

When the vehicle 1 arrives at the start point at which coasting starts, the EMS 110 and the TC 160 of the vehicle 1 may cause the engine to stop outputting a driving torque according to a control signal from the main processor 155.

When the vehicle 1 arrives at a start point of the second section S2, an acceleration force may be generated due to the slope of the second section S2. In the second section S2, the speed of the vehicle 1 may increase by +ΔV1 according to coasting of the vehicle 1.

Thereafter, when the vehicle 1 arrives at a start point of the third section S3 (that is, an end point of the second section S2), the vehicle 1 may perform coasting according to a gradient of the third section S3. As shown in FIG. 6, coasting may be additionally performed in an area S31 of the third section S3 according to the gradient of the third section S3.

Hereinafter, a method in which the cruise control system 150 according to an embodiment of the present disclosure maximizes a coasting distance will be described in detail with reference to FIG. 7.

Figure 7:
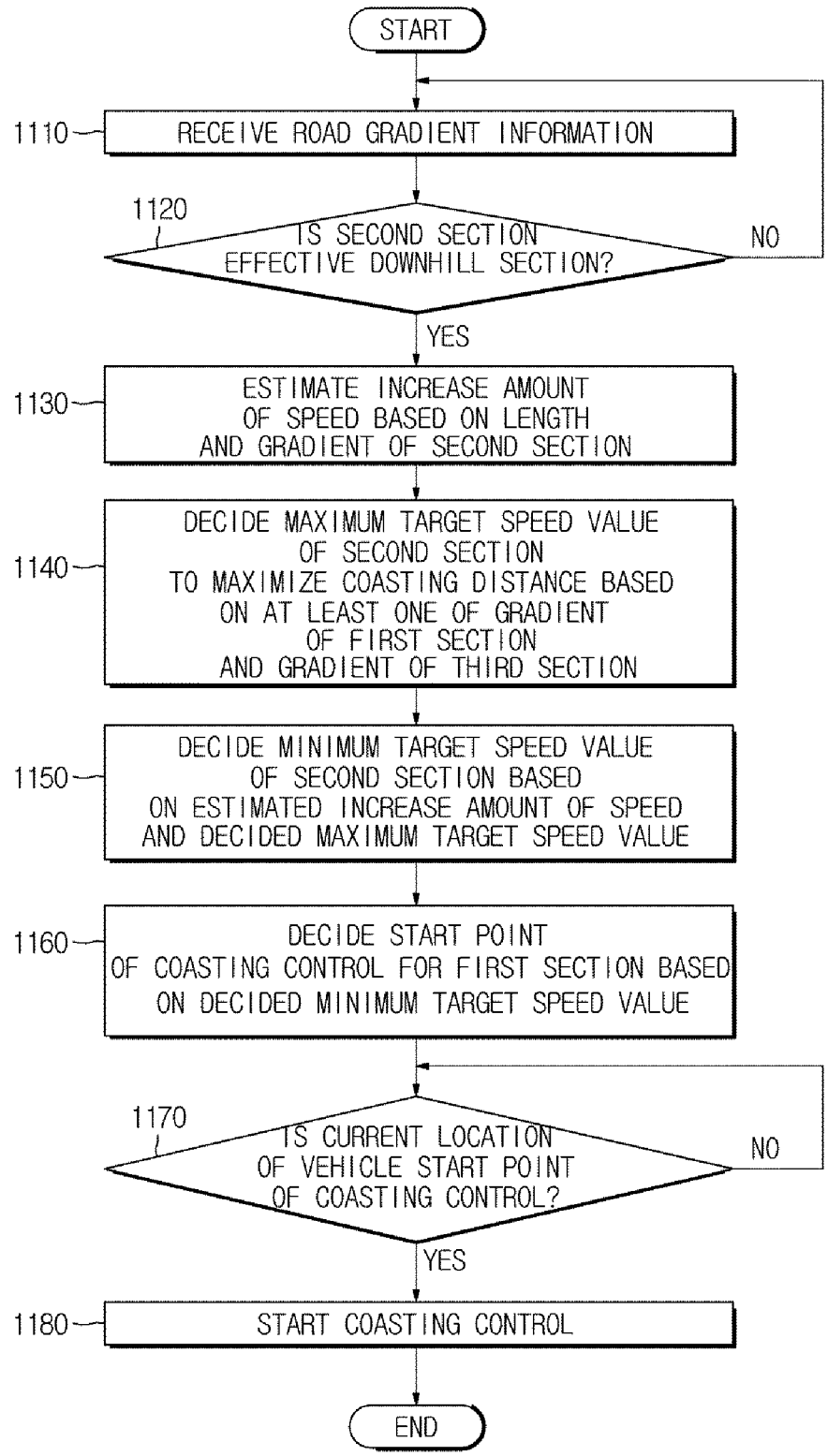
FIG. 7 is a flowchart illustrating a method of controlling a vehicle including a cruise control system according to an embodiment of the present disclosure.

FIG. 7 is a flowchart illustrating a method of controlling the vehicle including the cruise control system according to an embodiment of the present disclosure.

Referring to FIG. 7, the main processor 155 of the cruise control system 150 according to the embodiment may receive road gradient information from the AVN system 140 through the communicator 152 (operation 1110), and estimate an increase amount of speed of the next section (that is, the second section) of a section (that is, the first section) on which the vehicle 1 is currently located, based on the received road gradient information (operation 1130). In this case, the main processor 155 may determine whether the second section is an effective downhill section, and estimate an increase amount of speed if the second section is an effective downhill section (operation 1120).

At this time, the main processor 155 of the cruise control system 150 according to the embodiment may estimate an increase amount of speed based on the length and gradient of the second section (operation 1130).

Figure 8:
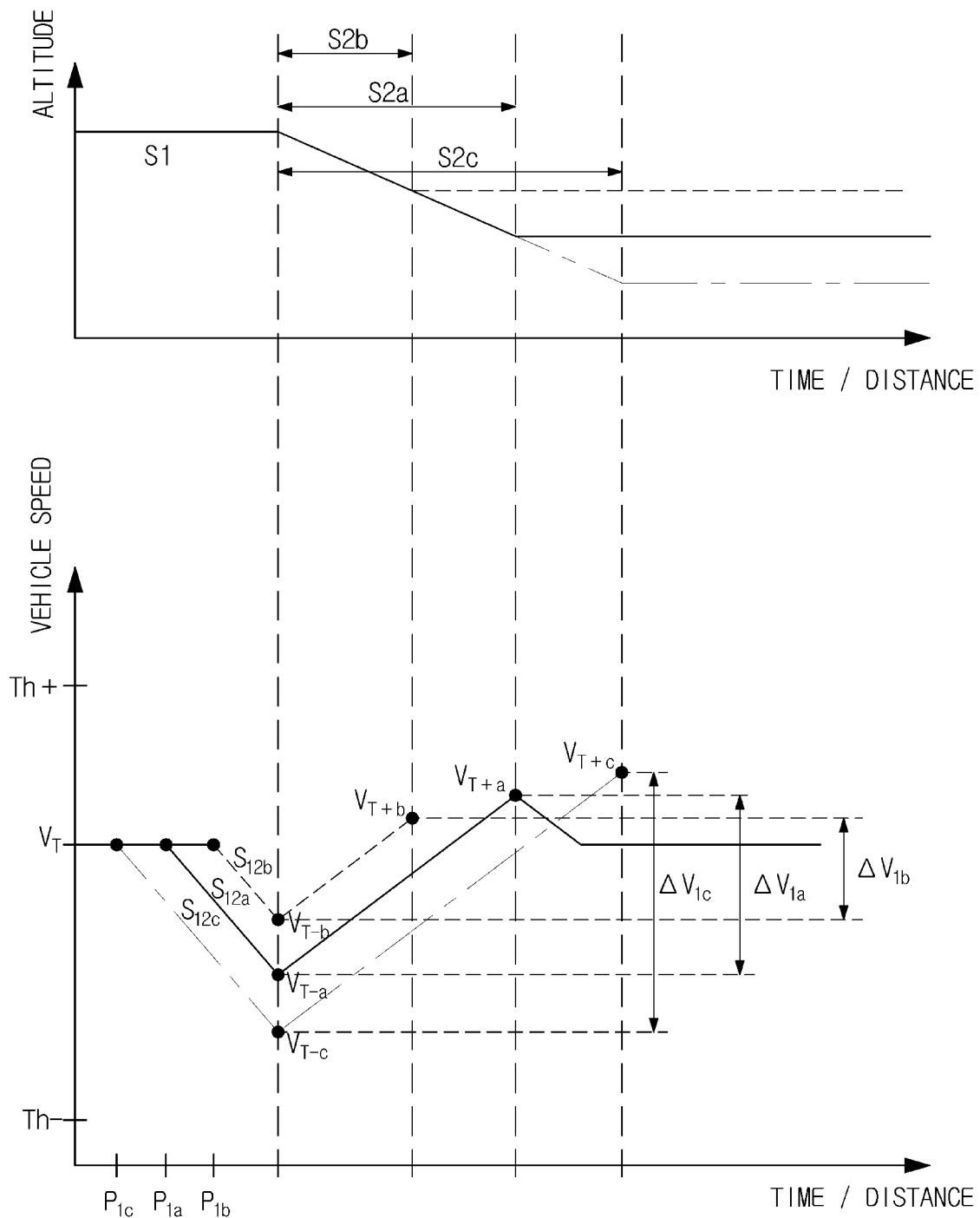
FIG. 8 is a graph of vehicle speed with respect to a length of a second section.
Figure 9:
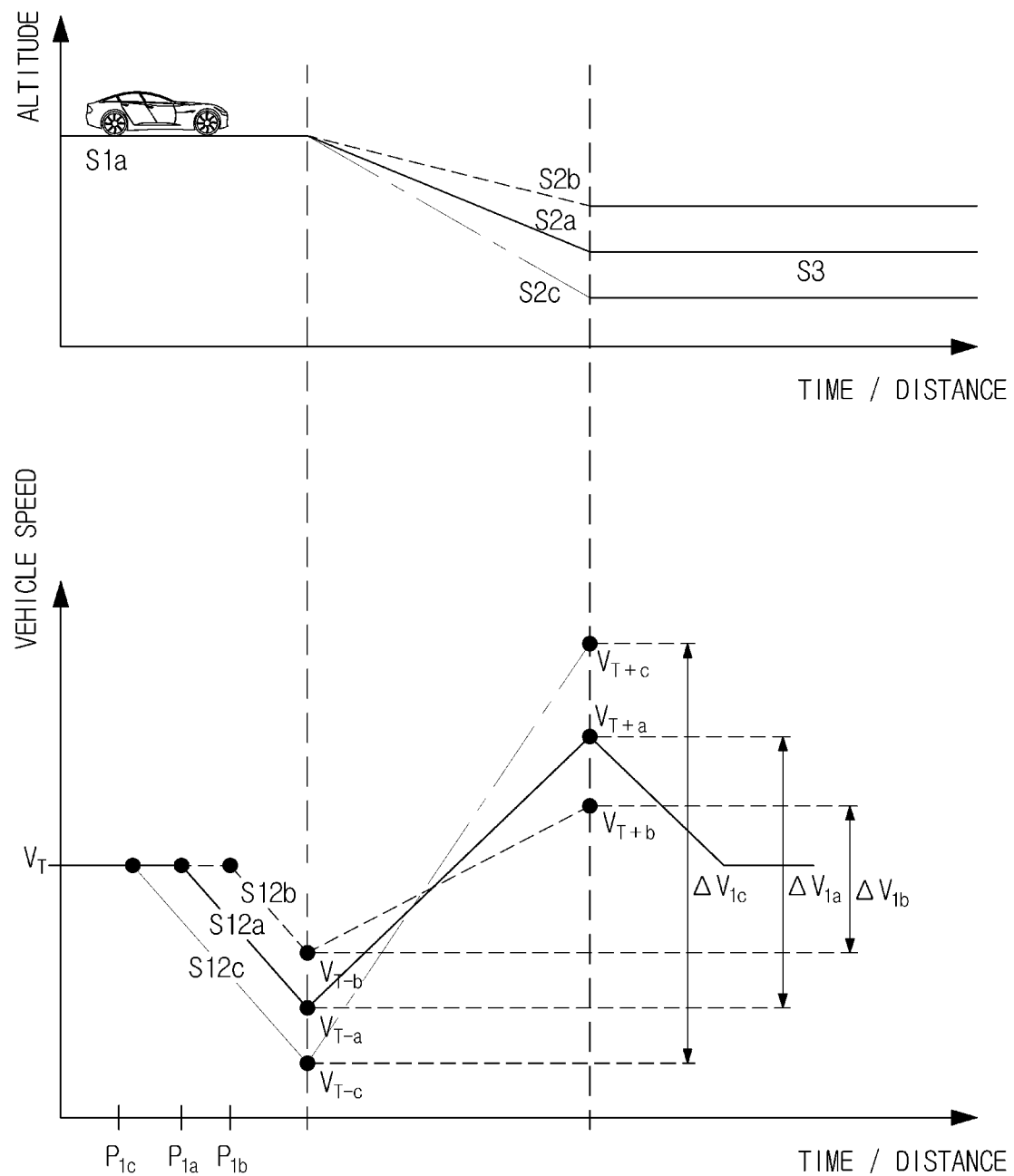
FIG. 9 is a graph of vehicle speed with respect to a gradient of a second section.

FIG. 8 is a graph of vehicle speed with respect to the length of the second section, and FIG. 9 is a graph of vehicle speed with respect to the gradient of the second section.

Referring to FIG. 8, the main processor 155 of the cruise control system 150 according to the embodiment may calculate an increase amount $\Delta V1a$, $\Delta V1b$, $\Delta V1c$ of speed in correspondence to the length of the second section $S2a$, $S2b$, $S2c$, The increase amount $\Delta V1a$, $\Delta V1b$, $\Delta V1c$ of speed may have a smaller value as the length of the second section S2 is shorter ($S2c>S2a>S2b$).

Referring to FIG. 9, the main processor 155 of the cruise control system 150 according to the embodiment may calculate an increase amount $\Delta V1a$, $\Delta V1b$, $\Delta V1c$ of speed in correspondence to the gradient of the second section $S2a$, $S2b$, $S2c$. In this case, the increase amount $\Delta V1a$, $\Delta V1b$, $\Delta V1c$ of speed may have a smaller value as the gradient of the second section S2 is lower ($S2c>S2a>S2b$).

Referring again to FIG. 7, the main processor 155 of the cruise control system 150 according to an embodiment may decide a maximum target speed value of the second section to maximize a coasting distance, based on at least one of the gradient of the first section and the gradient of the third section (operation 1140). Herein, the maximum target vehicle speed value of the second section may be vehicle speed at the start point of the third section or at the end point of the second section. Then, the main processor 155 may decide a minimum target speed value of the second section based on the estimated increase amount of speed and the decided maximum target speed value (operation 1150), and may decide a start point of coasting control for the first section based on the decided minimum target speed value (operation 1160). Herein, the minimum target speed value of the second section may be vehicle speed at the start point of the second section or at the end point of the first section.

For example, when the first section S1 and the third section S3 are flat, as shown in FIGS. 8 and 9, the main processor 155 may decide the maximum target speed value Vt+a, Vt+b, Vt+c of the second section S2 as a value that is greater than the target speed Vt.

More specifically, when the first section S1 and the third section S3 are flat, the main processor 155 may decide a value that is as greater as half the increase amount $\Delta V1a/2$, $\Delta V1b/2$ $\Delta V1c/2$ of speed of the second section S2 than the target speed Vt, as a maximum target speed value Vt+a, Vt+b, Vt+c of the second section S2, and may decide a value that is as smaller as half the increase amount $\Delta V1a/2$, $\Delta V1b/2$ $\Delta V1c/2$ of speed than the target speed Vt, as a minimum target speed value Vt−a, Vt−b, Vt−c of the second section S2.

Then, the main processor 155 may decide start point P1a, P1b, and P1c of coasting control for the first section S1 based on the minimum target speed values Vt−a, Vt−b, and Vt−c of the second section S2

Since the vehicle decelerates at constant speed in the coasting section S12a, S12b, S12c of the first section S1 (that is, the gradient of the graph in the coasting section S12a, S12b, S12c of the first section S1) when the first section S1 has a constant gradient, the main processor 155 may decide a point (P1c<P1a<P1b) farther away from the current position of the vehicle 1 as a start point of coasting control as a greater minimum target speed value is decided (Vt−c<Vt−a<Vt−b).

The main processor 155 of the cruise control system 150 according to the embodiment may decide a start point of coasting control for the first section S1, based on the gradient of the first section.

Figure 10:
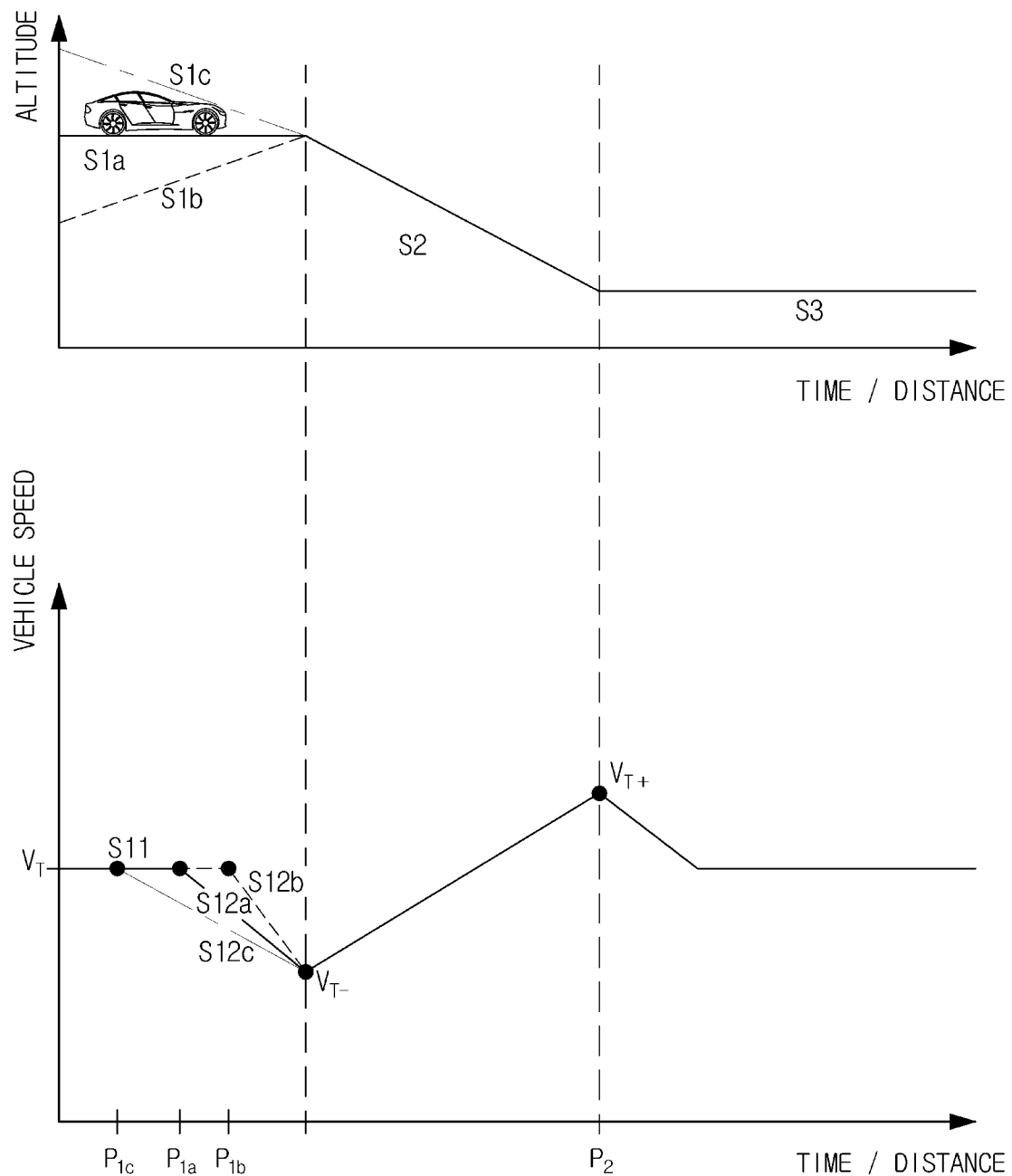
FIG. 10 is a graph of vehicle speed with respect to a gradient of a first section.

FIG. 10 is a graph of vehicle speed with respect to the gradient of the first section.

Deceleration in the coasting section S12a, S12b, S12c may be different depending on the gradient of the first section S1a, S1b, S1c. Referring to FIG. 10, since deceleration in the coasting section S12a, S12b, S12c is greater as the uphill gradient of the first section S1a, S1b, S1c is higher (as the downhill gradient of the first section S1a, S1b, S1c is lower), the main processor 155 of the cruise control system 150 according to the embodiment may decide a start point P1a, P1b, P1c of coasting control for the first section S1 based on the gradient of the first section S1a, S1b, S1c. In this case, the start point P1a, P1b, P1c of coasting control may be a point (P1c<P1a<P1b) farther away from the current position of the vehicle 1 as the uphill gradient of the first section S1 is higher (S1c<S1a<S1b).

On the other hand, deceleration of the vehicle 1 may increase in the first section S1a, S1b, S1c (that is, deceleration per hour increases) as the uphill gradient of the first section S1a, S1b, S1c is higher (S1c<S1a<S1b). As deceleration of the vehicle 1 increases, kinetic energy consumed in the coasting section S12a, S12b, S12c may also increase.

Therefore, in order to maximize energy efficiency, the main processor 155 of the cruise control system 150 according to another embodiment of the present disclosure may decide a maximum target speed value and a minimum target speed value according to the gradient of the first section S1a, S1b, S1c. FIG. 11 is another graph of vehicle speed with respect to the gradient of the first section.

More specifically, the main processor 155 of the cruise control system 150 according to another embodiment may decide a maximum target speed value Vt+a, Vt+b, Vt+c and a minimum target speed value Vt−a, Vt−b, Vt−c for the second section S2, based on the gradient of the first section S1a, S1b, S1c. In this case, the maximum target speed value Vt−a, Vt+b, Vt+c may be decided within a range that does not exceed the maximum threshold value Th+ of the target speed, and the minimum target speed value Vt−a, Vt−b, Vt−c may be decided within a range that is not smaller than the minimum threshold value Th− of the target speed. The minimum target speed value Vt−a, Vt−b, Vt−c and the maximum target speed value Vt+a, Vt+b, Vt+c may be decided as a greater value as the uphill gradient of the first section S1 is higher (as the downhill gradient of the first section S1 is lower; S1c<S1a<S1b), such that a difference between the maximum target speed value Vt+a, Vt+b, Vt+c and the minimum target speed value Vt−a, Vt−b, Vt−c does not exceed the estimated increase amount of speed.

Then, the main processor 155 may decide a start point P1a, P1b, P1c of coasting control for the first section S1, based on the gradient of the first section S1a, S1b, S1c and the minimum target vehicle speed value Vt−a, Vt−b, Vt−c.

That is, the main processor 155 of the cruise control system 150 according to an embodiment shown in FIG. 10 may decide a start point P1a, P1b, P1c of coasting control for the first section S1a, S1b, S1c based on the gradient of the first section S1a, S1b, S1c, and further, the main processor 155 of the cruise control system 150 according to another embodiment shown in FIG. 11 may decide a maximum target speed value Vt+a, Vt+b, Vt+c and a minimum target speed value Vt−a, Vt−b, Vt−c of the second section S2 in correspondence to the gradient of the first section S1a, S1b, S1c, and decide a start point P1a, P1b, P1c of coasting control for the first section S1a, S1b, S1c based on the minimum target speed value Vt−a, Vt−b, Vt−c and the gradient of the first section S1a, S1b, S1c.

Accordingly, energy efficiency in the first section S1a, S1b, S1c to the third section S3 can be maximized.

Also, in the third section S3a, S3b, S3c, deceleration of the vehicle 1 may increase (i.e., deceleration per hour increases) as the uphill gradient is higher (S3c<S3a<S3b), and kinetic energy consumed in the coasting section S31a, S31b, S31c (see FIG. 12) may also increases when deceleration of the vehicle 1 increases.

Figure 12:
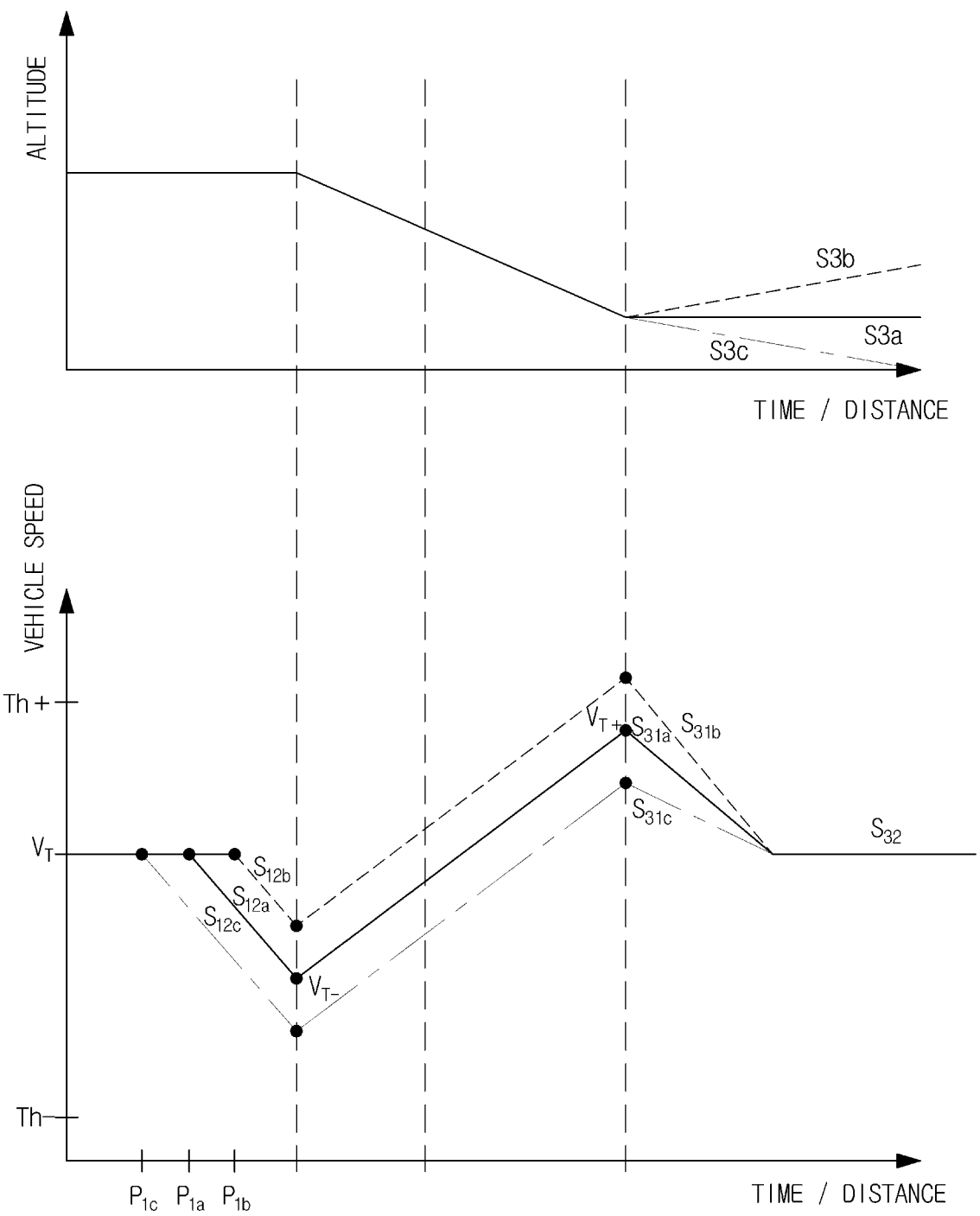
FIG. 12 is another graph of vehicle speed with respect to a gradient of a third section.

Therefore, in order to maximize energy efficiency, the main processor 155 of the cruise control system 150 according to the embodiment may decide a maximum target speed value and a minimum target speed value according to the gradient of the third section S3. FIG. 12 is another graph of vehicle speed with respect to the gradient of the third section.

More specifically, the main processor 155 of the cruise control system 150 according to the embodiment may decide a maximum target speed value Vt+a, Vt+b, Vt+c and a minimum target speed value Vt−a, Vt−b, Vt−c for the second section S2 based on the gradient of the third section S3a, S3b, S3c. In this case, the maximum target speed value Vt−a, Vt+b, Vt+c may be decided within a range that does not exceed the maximum threshold value Th+ of the target speed, and the minimum target speed value Vt−a, Vt−b, Vt−c may be decided within a range that is not smaller than the minimum threshold value Th− of the target speed. The minimum target speed value Vt−a, Vt−b, Vt−c and the maximum target speed value Vt+a, Vt+b, Vt+c may be decided as greater values as the uphill gradient of the third section S3 is higher (as the downhill gradient of the third section S3 is lower; S3c<S3a<S3b), such that a difference between the maximum target speed value Vt+a, Vt+b, Vt+c and the minimum target vehicle speed value Vt−a, Vt−b, Vt−c does not exceed the estimated increase amount of speed.

Then, the main processor 155 may decide a start point P1a, P1b, P1c of coasting control for the first section S1 based on the gradient of the first section S1a, S1b, S1c (the gradient is constant in FIG. 12) and the minimum target vehicle speed value Vt−a, Vt−b, Vt−c.

As such, the main processor 155 of the cruise control system 150 according to an embodiment may decide a maximum target speed value and a minimum target speed value of the second section S2 to maximize a coasting distance (that is, to maximize energy efficiency), based on the gradient of the first section S1 or the gradient of the third section S3, and decide a start point P1 of coasting control for the first section S1, based on the minimum target speed value. Also, the main processor 155 may decide a maximum target speed value and a minimum target speed value in consideration of both the gradient of the first section S1 and the gradient of the third section, and decide a start point P1 of the first section S1 as apparent from the above-described embodiments.

Figure 13:
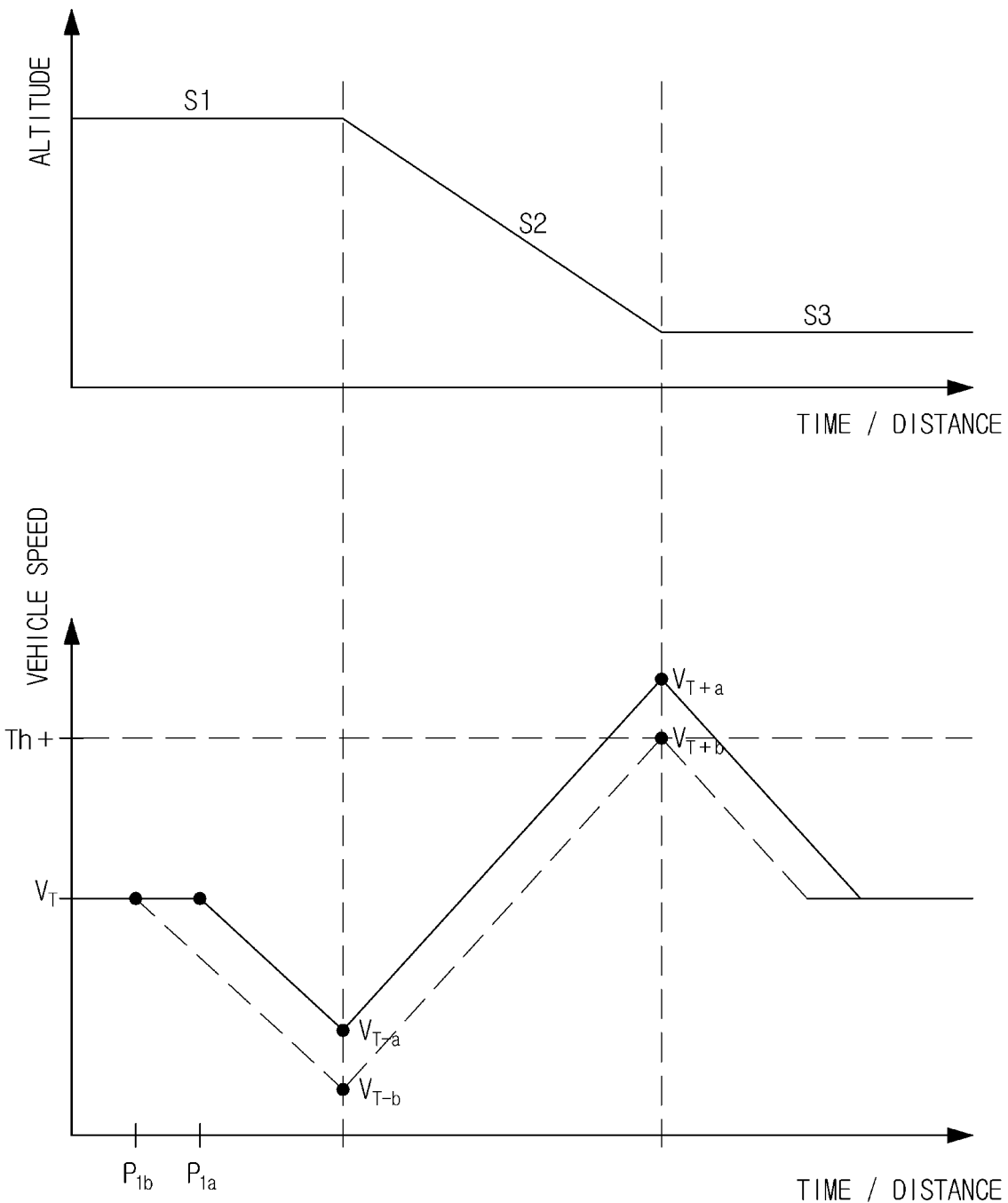
FIG. 13 is another graph of vehicle speed exceeding a maximum threshold value of a target speed.

When the maximum target speed value Vt+ decided by the main processor 155 is greater than the maximum threshold value Th+ of the target speed, or when the minimum target speed value Vt− decided by the main processor 155 is smaller than the minimum threshold value Th− of the target speed, the main processor 155 may increase or decrease the maximum target speed value Vt+ and the minimum target speed value Vt−. FIG. 13 is another graph of vehicle speed exceeding the maximum threshold value of the target speed.

For example, referring to FIG. 13, if the maximum target speed value Vt+ decided by the main processor 155 is greater than the maximum threshold value Th+ of the target speed, the main processor 155 of the cruise control system 150 according to an embodiment may decrease the maximum target speed value Vt+ and the minimum target speed value Vt− (Vt+a−Vt+b) so that the maximum target speed value Vt+a becomes equal to the maximum threshold value Th+ of the target speed. As a result, the start point P1a, P1b of coasting control for the first section S1 can move close to the current position of the vehicle 1.

Further, although not shown, if the minimum target speed value Vt− decided by the main processor 155 is smaller than the minimum threshold value Th− of the target speed, the main processor 155 of the cruise control system 150 according to the embodiment may increase the maximum target speed value Vt+ and the minimum target speed value Vt− so that the minimum target speed value Vt−a becomes equal to the minimum threshold value Th− of the target speed. As a result, the start point of coasting control for the first section S1 can move away from the current position of the vehicle 1.

Referring again to FIG. 7, the main processor 155 of the cruise control system 150 according to the embodiment may perform the aforementioned operations 1110 to 1160 of deciding the start point of coasting control for the first section in real time, and control the EMS 110 and the TC 160 to perform deceleration control (1180) when the vehicle 1 arrives at the start point of coasting control (1170).

Although not shown, if the maximum target speed value Vt+ a decided by the main processor 155 is greater than the maximum threshold value Th+ of the target speed, the main processor 155 may control the brake control apparatus 120 to perform brake control for a section in which the vehicle speed exceeds the maximum target speed value Vt+a. On the other hand, if the minimum target vehicle speed value Vt−a decided by the main processor 155 is smaller than the minimum threshold value Th− of the target vehicle speed, the main processor 155 may control the EMS 110 and the TC 160 to output the driving torque of the engine for a section in which the vehicle speed is smaller than the minimum target speed value Vt−a.

As is apparent from the above description, in the vehicle and the control method thereof according to the disclosed embodiments, a waste of fuel due to unnecessary deceleration control can be reduced, thereby increasing energy efficiency.

Furthermore, in the vehicle and the control method thereof according to the disclosed embodiments, it is possible to reduce a problem in which the life cycle of the brake pads is shortened due to unnecessary deceleration control and a problem in which the brake performance deteriorates due to abrasion of the brake pads.

The embodiments as described above may be embodied in the form of recording medium to store commands that can be executed by a computer. The commands may be stored in the form of program codes, and can create a program module, when executed by the processor, to perform the operations of the above-described embodiments. The recording medium may be embodied as computer-readable recording medium.

The computer-readable recording medium includes any kind of recording device to store commands that can be interpreted by a computer. For example, the computer-readable recording medium may be ROM, RAM, a magnetic tape, a magnetic disk, flash memory, or an optical data storage device.

While embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle comprising:
an engine management system configured to drive an engine to adjust a driving torque of the engine to accelerate the vehicle;
a communicator configured to receive road gradient information; and
a controller configured to control the engine management system such that a driving speed of the vehicle follows a target speed,
wherein the controller estimates an increase amount of speed of a next downhill section based on the road gradient information, and decides a start point of coasting control for a current section to maximize a coasting distance, based on the estimated increase amount of speed.

2. The vehicle according to claim 1, wherein the controller decides the start point of coasting control for the current section, based on the estimated increase amount of speed and a road gradient of the current section.

3. The vehicle according to claim 1, wherein the controller decides a maximum target speed value of the next downhill section to maximize the coasting distance, based on the estimated increase amount of speed, and decides the start point of coasting control for the current section based on the decided maximum target speed value of the next downhill section.

4. The vehicle according to claim 3, wherein the maximum target speed value of the next downhill section is greater than the target speed.

5. The vehicle according to claim 3, wherein, if the current section is a first section, a next downhill section of the first section is a second section, and a next downhill section of the second section is a third section, the controller decides a maximum target speed value of the second section based on a road gradient of the third section.

6. The vehicle according to claim 5, wherein the controller decides a maximum target speed value of the second section based on a road gradient of the first section and a road gradient of the third section.

7. The vehicle according to claim 6, wherein the controller decides a value that is greater by half an increase amount of speed of the second section than the target speed, as the maximum target speed value of the second section, when the first section and the third section are flat.

8. The vehicle according to claim 1, wherein the controller estimates an increase amount of speed of the next downhill section, based on a road gradient and a length of the next downhill section.

9. The vehicle according to claim 1, wherein the controller determines whether the next downhill section is an effective downhill section in which coasting acceleration occurs, based on the road gradient information, and if the controller determines that the next downhill section is the effective downhill section, the controller estimates the increase amount of speed of the next downhill section, and decides the start point of coasting control for the current section to maximize the coating distance, based on the estimated increase amount of speed.

10. The vehicle according to claim 1, wherein the road gradient information includes information about a road gradient of the current section, a road gradient of the next downhill section, and a distance from the vehicle.

11. The vehicle according to claim 1, further comprising a brake control apparatus configured to control braking of the vehicle,
wherein the controller controls the brake control apparatus to perform braking if the driving speed of the vehicle exceeds a predetermined maximum threshold value of the target speed.

12. The vehicle according to claim 1, wherein when a cruise control system operates, the controller controls the engine management system such that the driving speed of the vehicle follows the target speed, and releases the operation of the cruise control system, if the driving speed of the vehicle exceeds a predetermined maximum threshold value of the target speed or if the driving speed of the vehicle is smaller than a predetermined minimum threshold value of the target speed.

13. A method of controlling a vehicle, the vehicle controlling engine management system such that a driving speed of the vehicle follows a target speed, the method comprising steps of:
receiving road gradient information;
estimating an increase amount of speed of a next downhill section based on the road gradient information; and
deciding a start point of coasting control for a current section to maximize a coasting distance, based on the estimated increase amount of speed.

14. The method according to claim 13, wherein the step of deciding the start point of coasting control comprises deciding the start point of coasting control for the current section based on the estimated increase amount of speed and a road gradient of the current section.

15. The method according to claim 13, wherein the step of deciding the start point of coasting control further comprises steps of:
deciding a maximum target speed value of the next downhill section to maximize the coasting distance, based on the estimated increase amount of speed; and
deciding the start point of coasting control for the current section based on the decided maximum target speed value of the next downhill section.

16. The method according to claim 15, wherein if the current section is a first section, a next down section of the first section is a second section, and a next section of the second section is a third section, the step of deciding the maximum target speed value comprises deciding a maximum target speed value of the second section based on a road gradient of the third section.

17. The method according to claim 16, wherein the step of deciding of the maximum target speed value comprises deciding the maximum target speed value of the second section based on a road gradient of the first section and a road gradient of the third section.

18. The method according to claim 17, wherein the step of deciding of the maximum target speed value comprises deciding a value which is greater by half the increase amount of speed of the second section than the target speed, as a maximum target speed value of the second section, when the first section and the third section are flat.

19. The control method according to claim 13, wherein the step of estimating of the increase amount of speed comprises estimating an increase amount of speed of the next downhill section based on a road gradient and a length of the next downhill section.

20. The control method according to claim 13, before the step of estimating of the increase amount of speed, further comprising determining whether the next downhill section is an effective downhill section in which coasting acceleration occurs, based on the road gradient information,
wherein the step of estimating of the increase amount of speed comprises estimating an increase amount of speed of the next downhill section if the next downhill section is the effective downhill section.

* * * * *